UNITED STATES PATENT OFFICE 2,104,968

PROCESS OF PREPARING PURIFIED GLYCYRRHIZINE

Simon Hendrik Bertram, The Hague, Netherlands

No Drawing. Application November 7, 1935, Serial No. 48,693. In Belgium November 10, 1934

5 Claims. (Cl. 260—109)

Glycyrrhizine is used for various purposes, for instance as a sweetening medium for bad smelling drugs, for tobacco and cigarettes, and as a froth producing sweetening substance in the manufacture of mineral waters and beer. This glycyrrhizine, which is often obtained from licorice juice, is formed as a black mass containing many impurities.

I have discovered that this raw glycyrrhizine can be extensively purified and transformed into a light colored product which has many times the sweetening capacity of the raw black glycyrrhizine and which, owing to its light coloration, may be used for many other purposes where the raw product can only be used in a very restricted scope.

According to the invention, the wet cake of the raw glycyrrhizinic acid, as it is obtained from the solution of licorice, which cake however has been conveniently freed by a preliminary drying from a part of its water, is treated with a substance which positively dissolves the glycyrrhizine, but not the accompanying impurities. Numerous experiments have shown that, for this purpose, only use can be made of an alcohol or a mixture of alcohols, which is capable of partially dissolving water, which is not homogeneously miscible in any proportion with water and which, moreover, has a sufficiently volatile character. In this way, use can be made of various primary, secondary and tertiary aliphatic alcohols, terpene alcohols and aromatic alcohols.

Obviously, for practical purposes, an alcohol will be elected which is of reduced cost and has sufficient volatility, such as for instance pine oil, terpineol, amyl alcohol, benzyl alcohol or mixtures thereof, said materials having been found practically useful solvents. Pine oil, for instance, free from water, only dissolves a small portion of glycyrrhizinic acid or not at all, but when saturated with water, it perfectly dissolves said acid. Moreover, pine oil does not dissolve or only dissolves in very reduced range the impurities of the raw glycyrrhizine. By carefully treating the somewhat warm, wet or partially dried cake of glycyrrhizinic acid in determined proportions by weight with for instance dry warm pine oil, the mixture can be easily separated in an upper layer of purified alcoholic solution of glycyrrhizine and a thick black precipitate, which contains the impurities, water and pine oil. The alcoholic solution is then treated with an absorbing medium, such as the substance known as "Norit" (absorbing carbon), which proved to be practically useful, but obviously all other active absorption mediums may be used for the purpose. After agitation, the precipitate and the absorbing medium used are separated, by filtration, from the purified glycyrrhizine solution. The alcoholic solution of glycyrrhizinic acid has now a pale coloration and can be submitted, if necessary, to a further bleaching operation.

For this purpose, according to the invention, use will be made preferably of a solution of the product known as "Blanquette" (hydrosulphite of sodium, $Na_2S_2O_4$), but obviously, other reducing bleaching agents, such as hyposulphite of sodium, may also be used. Moreover, bleaching can be omitted when the glycyrrhizine is to be used for a purpose for which the main portion of impurities should only be eliminated, but for which it is not an absolute requirement that the glycyrrhizine should have the least possible coloration.

After the bleaching operation, dilute aqua ammonia or a solution of an alkali metal hydroxide is added to the alcoholic solution, under strong agitation. A layer of the purified ammonium or alkali metal salt of the glycyrrhizinic acid now separates from the salt solution, said layer being adapted to be dried according to a known method.

The following example of practical embodiment will illustrate the process:

The wet or partially dried cake of the raw glycyrrhizinic acid having a temperature of about 45° C., as it is obtained for instance from a solution of licorice, is freed from any mineral acid by washing, and carefully, i. e. under slow agitation, mixed thoroughly with about ¾ of its weight of dry pine oil at a temperature of about 75° C. During this mixing, the temperature is kept between 50° C. and 60° C. The mixture is left to precipitate and the upper layer is then removed by decanting. Now the residue is treated in the same manner, with ¼ of the weight of the original cake of dry pine oil. The latter operation has for object to eliminate the last remaining portion of glycyrrhizine from said residue.

In this way is obtained:
(1) A pine oil solution of purified glycyrrhizine.
(2) A thick black refuse which still contains liquid and pine oil.

The solution of purified glycyrrhizine is agitated under addition of some absorbing medium such as "Norit" (5 grams per liter) at a temperature of about 50° C., and afterwards filtered.

Bleaching is performed by adding to the solution, under strong agitation or by shaking, at 50° C. to 60° C., about 3% of the weight of the original cake of the substance known as "Blanquette", dissolved in 30 times its weight of water. After about 15 to 20 minutes agitation, the mixture is left to precipitate. After some hours, the aqueous clear under-layer is removed.

Now the solution is washed twice with about 0.1 of its volume of water. This washing is necessary for removing the rest of bleaching medium. The washing is also performed under strong agitation at 50° C. to 60° C., followed by a separation and removal of the layer of water.

The pine oil solution is then treated under strong agitation with a dilute solution of ammonium hydroxide (equal volumes of aqua ammonia specific weight 0.91 and water). After precipitation, the under-layer, which now contains the purified ammonium salt of glycyrrhizinic acid is removed and dried. This drying operation is performed according to known methods.

I claim:

1. The process of preparing purified glycyrrhizine, which consists in treating the raw glycyrrhizinic acid with an alcohol capable of partially dissolving water but which is not homogeneously miscible in all proportions with water, treating the alcoholic solution with an absorbent medium, treating the resulting solution under strong agitation with a dilute solution of ammonium hydroxide, and separating the ammonium salt of glycyrrhizinic acid obtained.

2. The process of preparing purified glycyrrhizine, which consists in treating the raw glycyrrhizinic acid with an alcohol capable of partially dissolving water but which is not homogeneously miscible in all proportions with water, treating the alcoholic solution with an absorbent medium and then with a reducing bleaching medium, treating the resulting solution under strong agitation with a dilute solution of ammonium hydroxide, and separating the ammonium salt of glycyrrhizinic acid obtained.

3. The process of preparing purified glycyrrhizine, which consists in treating the raw glycyrrhizinic acid with pine oil, treating the alcoholic solution with an absorbent medium and then with a bleaching medium, treating the resulting solution under strong agitation with a dilute solution of ammonium hydroxide, and separating the ammonium salt of glycyrrhizinic acid.

4. The process of preparing purified glycyrrhizine, which consists in treating the raw glycyrrhizinic acid with an alcohol capable of partially dissolving water but which is not homogeneously miscible in all proportions with water, treating the alcoholic solution with an absorbent medium known as "Norit", treating the resulting solution under strong agitation with a dilute solution of ammonium hydroxide, and separating the ammonium salt of glycyrrhizinic acid obtained.

5. The process of preparing purified glycyrrhizine, which consists in treating the raw glycyrrhizinic acid with an alcohol capable of partially dissolving water but which is not homogeneously miscible in all proportions with water, treating the alcoholic solution with an absorbent medium and then with a reducing bleaching medium known as "Blanquette" ($Na_2S_2O_4$), treating the resulting solution under strong agitation with a dilute solution of ammonium hydroxide, and separating the ammonium salt of glycyrrhizinic acid obtained.

SIMON HENDRIK BERTRAM.